Figure 1:
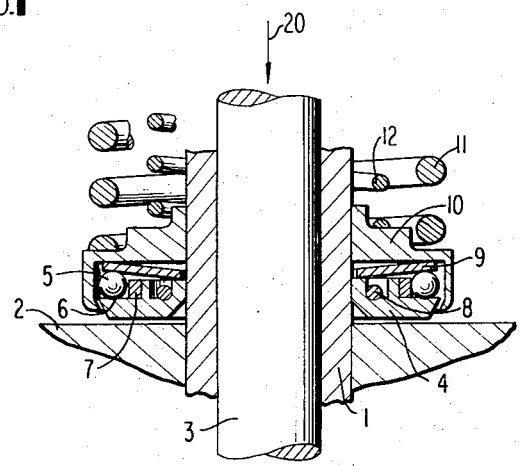

United States Patent [19]
Enke et al.

[11] 3,717,133
[45] Feb. 20, 1973

[54] INSTALLATION FOR PRODUCING A ROTARY MOVEMENT OF A VALVE IN AN INTERNAL COMBUSTION ENGINE

[75] Inventors: Kurt Enke, Kirchheim/Teck; Werner Altmann, Stuttgart, both of Germany

[73] Assignee: Daimler-Benz Aktiengesellschaft, Stuttgart-Unterturkheim, Germany

[22] Filed: Oct. 23, 1970

[21] Appl. No.: 83,443

[30] Foreign Application Priority Data

Oct. 24, 1969 Germany.....................P 19 53 571.8

[52] U.S. Cl..................................123/90.3, 137/331
[51] Int. Cl.................................................F01l 1/32
[58] Field of Search..............123/90.28, 90.29, 90.3; 137/331

[56] References Cited

UNITED STATES PATENTS

| | | |
|---|---|---|
| 2,582,060 | 1/1952 | Newton.............................123/90.3 |
| 2,775,959 | 1/1957 | Geer.................................123/90.3 |
| 2,827,886 | 3/1958 | Geer.................................123/90.3 |
| 2,855,913 | 10/1958 | Geer.................................123/90.3 |
| 2,935,058 | 5/1960 | Dooley..............................123/90.3 |
| 3,421,734 | 1/1969 | Updike et al......................123/90.3 |

*Primary Examiner*—Al Lawrence Smith
*Attorney*—Craig, Antonelli & Hill

[57] ABSTRACT

An installation for producing a rotary movement in a valve of an internal combustion engine which is composed of a non-rotatable pressure plate, of balls that are supported in inclined tracks on the pressure plate, of springy means which force the balls in a circumferential direction, of a cup spring supported on the balls and on the pressure plate, and of a rotatable part supported on the cup spring; the valve springs engage at the rotatable part while the balls are arranged in a cage at which engages the springy means.

13 Claims, 3 Drawing Figures

PATENTED FEB 20 1973

3,717,133

INVENTORS
KURT ENKE
WERNER ALTMANN

BY Craig, Antonelli, Stewart & Hill
ATTORNEYS

INSTALLATION FOR PRODUCING A ROTARY MOVEMENT OF A VALVE IN AN INTERNAL COMBUSTION ENGINE

The present invention relates to an installation for producing a rotary movement in a valve of an internal combustion engine, which essentially consists of a non-rotatable pressure or thrust plate fixed against rotation, of balls which are supported in inclined tracks on the pressure plate, of springy means which press the balls in a circumferential direction, of a cup spring supported on the balls and the pressure plate and of a rotating part supported at the cup spring, at which engages the valve spring.

In installations of this type, one spring each is coordinated to one ball which presses the ball in one circumferential direction. When practically utilizable dimensions are maintained for the installation, only relatively few balls, as a rule five to six balls, can be accommodated by reason of the space requirement of the springs. This entails the disadvantage that the inclined tracks in the pressure plate have a relatively slight length of life by reason of the relatively large forces to be transmitted by each ball.

The present invention aims at so constructing the installation that for purposes of increasing the length of life thereof, relatively many balls can be provided. The underlying problems are solved according to the present invention in that the balls are arranged at a cage and springy means engage at the cage.

It becomes possible by the present invention to provide only a single spring which transmits its force to the balls by way of the cage. Since with the arrangement of a single or of a few springs a large amount of space is economized, a large number of balls may be provided for the forces to be transmitted.

In most applications, it suffices if in realization of the inventive subject matter, the springy means consist of only one coil spring which is supported, on the one hand, at the pressure plate and, on the other, at the cage. However, in case that for constructive conditions the inertia masses to be accelerated by the springy means become so large that a single spring does not suffice for the acceleration, also two coil springs may be provided disposed mutually opposite one another which are supported, on the one hand, at the pressure plate and, on the other, at the cage.

In a structurally favorable manner, the springy means may also consist of a spiral spring or volute spring which is arranged in an annularly shaped recess at the pressure plate and which is connected with its one end with the pressure plate and with its other end with the cage.

In order to assure with the large number of the balls to be accommodated, a sufficient safety against a jumping over from one inclined track to the next inclined track, the inclined tracks may be inclined only in one direction and maybe constructed approximately egg-shaped—as seen in plan view.

Accordingly, it is an object of the present invention to provide an installation for imparting a rotary motion to the valves of internal combustion engines which avoids by simple means the aforementioned shortcomings and drawbacks encountered in the prior art.

Another object of the present invention resides in an installation for producing a rotary movement of a valve of an internal combustion engine which permits the use of a relatively large number of balls without substantially increasing the space requirement, thus reducing the specific pressure to be transmitted by a respective ball.

A further object of the present invention resides in an installation for imparting a rotary movement to a valve of an internal combustion engine which is not only relatively space-saving but also increases the length of life of the installation.

Figure 2:
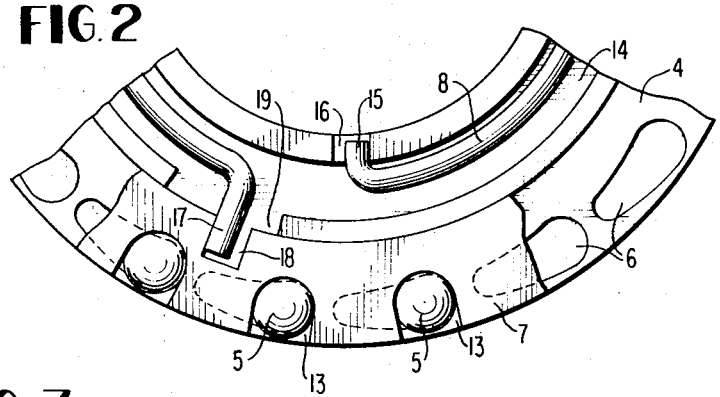
Figure 3:
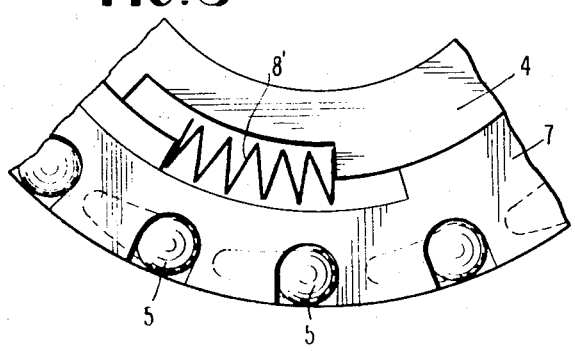

These and further objects, features and advantages of the present invention will become more obvious from the following description when taken in connection with the accompanying drawing which shows, for purposes of illustration only, one embodiment in accordance with the present invention, and wherein:

FIG. 1 is a partial cross-sectional view through the installation in accordance with the present invention, FIG. 2 is a plan view, on an enlarged scale, of a part of the pressure plate with cage and spiral spring of an installation in accordance with the present invention, and FIG. 3 is a plan view, on an enlarged scale, of a part of the pressure plate with cage and coil springs of an installation in accordance with the present invention.

Referring now to the drawings wherein like reference numerals are used throughout the two views to designate like parts, and more particularly to FIG. 1, the installation illustrated in this figure for producing a rotary movement in a valve of an internal combustion engine, of which only the valve stem 3 guided within a valve guidance 1 in a cylinder head 2 is illustrated, essentially consists of the pressure plate 4 non-rotatably mounted on the cylinder head 2, of balls 5 which are supported on the pressure plate 5 in inclined tracks 6, of a cage 7 for the balls 5, of a spiral spring 8 which seeks to rotate the cage 7 with respect to the pressure plate 4, of a cup spring 9 and of a rotatable part 10 on which are supported the valve springs 11 and 12.

As can be seen more clearly from FIG. 2, the inclined tracks 6 are arranged in the area of the outer circumference of the pressure or thrust plate 4. As viewed in plan view, the tracks 6 have an approximately egg-shaped configuration. The lowest or deepest point is disposed in each inclined cam track 6 within the area of the greatest width thereof. The balls 5 arranged in the inclined tracks 6 are disposed in recesses 13 that are provided in the cage 7. An annularly shaped recess 14 is arranged in the radially inner area of the pressure plate 4, in which is disposed the spiral or volute spring 8. The spiral, tension spring 8 engages with its one end 15 in the aperture 16 at the pressure plate 4. With its other end 17, the spiral spring 8 engages in the aperture 18 at the cage 7, whereby it projects through the relatively larger aperture 19 at the pressure plate 4.

The spiral spring 8 is arranged in such a manner that it presses the cage 7 and therewith the balls 5 in the circumferential direction of the pressure plate 4 against the rising portions of the inclined tracks 6. If during actuation of the valve, the valve stem 3 is pushed in the direction of arrow 20 (FIG. 1), an additional pressure is exerted on the rotatable part 10 by way of the valve spring 11 and 12 which becomes effective on the balls 5 by way of the cup spring 9. As a result thereof, the balls 5 roll in the inclined tracks 6 downwardly in the direction of the greatest depth of the inclined tracks 6 and the rotatable part 10 together with the valve springs 11 and 12 and the remaining parts of the valves as well as the valve itself are thereby rotated by way of the cup spring 9. If the valve moves subsequently in a direction opposite the arrow 20, then the spiral spring 8 forces the balls 5 by means of the cage 4 again onto the rising portions of the inclined tracks 6.

The cage 7 may be made of any known light metal. Possibly, it may also consist of any suitable, conventional synthetic resinous material.

In case that instead of a spiral spring a coil spring is to be used, the coil spring 8' is preferably arranged in a recess at the cage appropriately disposed on a circle in such a manner that it is supported with one end at the pressure plate and with the other end at the cage as shown in FIG. 3, the balls being arranged on the cage. With an arrangement of two coil springs, another coil spring 8' (not shown) is appropriately arranged mutually opposite the spring 8' of FIG. 3.

While we have shown and described several embodiments in accordance with the present invention it is obvious that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

What I claim is:

1. An installation for producing a rotary movement in a valve of an internal combustion engine, which includes a substantially nonrotatable pressure plate, ball means supported in inclined track means on the pressure plate, first elastic spring means which force the balls in one circumferential direction, second spring means operatively interposed between the ball means and the pressure plate on one side and a rotatable part on the other side, and the rotatable part engaging the second spring means, with valve springs engaging at the rotatable part, characterized in that the ball means are arranged in a cage means for guiding the ball means, the cage means being arranged for movement with the ball means, and in that the first spring means engage at the cage means.

2. An installation according to claim 1, characterized in that the second spring means is a cup spring.

3. An installation according to claim 1, characterized in that the first spring means includes at least one coil spring which is supported, on the one hand, at the pressure plate and, on the other, at the cage means.

4. An installation according to claim 3, characterized in that a single coil spring is provided.

5. An installation according to claim 1, characterized in that the first spring means include two mutually oppositely disposed coil springs which are supported, on the one hand, at the pressure plate and, on the other, at the cage means.

6. An installation according to claim 1, characterized in that the first spring means essentially consists of a torsion spring of spiral shape which is arranged in an annularly shaped recess at the pressure plate and is operatively connected with one end thereof with the pressure plate and with the other end thereof with the cage means.

7. An installation according to claim 6, characterized in that the inclined track means are inclined in only one direction.

8. An installation according to claim 7, characterized in that the inclined track means are of approximately egg-shape configuration as viewed in plan view.

9. An installation according to claim 8, characterized in that the second spring means is a cup spring.

10. An installation according to claim 11, characterized in that the inclined track means are inclined in only one direction.

11. An installation according to claim 1, characterized in that the inclined track means are of approximately egg-shape configuration as viewed in plan view.

12. An installation according to claim 11, characterized in that the first spring means includes a coil spring which is supported, on the one hand, at the pressure plate and, on the other, at the cage means.

13. An installation according to claim 11, characterized in that the first spring means include two mutually oppositely disposed coil springs which are supported, on the one hand, at the pressure plate and, on the other, at the cage means.

* * * * *